United States Patent

[11] 3,545,768

[72] Inventor Henry James Fortune
Swindon, England
[21] Appl. No. 783,814
[22] Filed Dec. 16, 1968
[45] Patented Dec. 8, 1970
[73] Assignee The Plessey Company Limited
Ilford, England
a British Company
[32] Priority Dec. 22, 1967
[33] Great Britain
[31] No. 58,386/67

[54] RECORD PLAYERS

6 Claims, 3 Drawing Figs.

[52] U.S. Cl. .......... 274/47
[51] Int. Cl. .......... G11b 3/58
[50] Field of Search .......... 274/47, 1, 54, 47

[56] References Cited
UNITED STATES PATENTS

| | | | |
|---|---|---|---|
| 3,366,390 | 1/1968 | Applequist | 274/47 |
| 3,311,380 | 3/1967 | Hammerand | 274/15 |
| 3,185,485 | 5/1965 | Brubaker | 274/47 |
| 1,423,523 | 7/1922 | Grow | 274/47 |
| 2,294,660 | 9/1942 | Hess | 274/47 |

*Primary Examiner*—Harry N. Haroian
*Attorney*—Blum, Moscovitz, Friedman and Kaplan

ABSTRACT: A record cleaning brush for an automatic changer includes means for moving a brush or pad from the position clear of the turntable to a position where it extends across the playing surface. The brush can be moved into cleaning engagement with the playing surface by a downward movement and preferably is moved away again before playing of the record takes place.

The cleaning operation takes place in about three revolutions of the turntable and a dwell is introduced into the normal record changing sequence to enable cleaning to take place under full power and without speeding up the other operations of the changing cycle. The sequence of operations is accomplished by the use of two gapped cam gears driven from a single turntable pinion, the normal cam gear having an extra gap so that it is arrested during rotation of the other cam gear for brush operation, after which the brush operating cam gear sets the normal cam gear in motion again to complete the record changing cycle.

RECORD PLAYERS

BACKGROUND OF THE INVENTION

This invention relates to disc record reproducing apparatus in which records can be played automatically in succession and has as its principal object the provision of means for automatically cleaning a record before play.

According to the present invention an automatic record changing disc record player comprises a cleaning brush or pad, actuating means for automatically moving the brush or pad between a position in which it is clear of the turntable so that a record can be positioned thereon to a position in which it extends over the playing surface of the record on the turntable and means for automatically moving the brush or pad into and out of cleaning contact with the record surface so that the record surface may be cleaned.

In most automatic record changing disc record players there is little spare power to be obtained from the motor during the record changing cycle but it is during this period that it is desirable that the cleaning operation should take place since any friction involved could adversely affect the playing speed of the record player. However, effective cleaning calls for about three revolutions of the turntable and according to a special feature of the invention a dwell is introduced into the normal record changing operation after a fresh record has been dropped on to the turntable, during which dwell the turntable continues to be driven and the movements of the brush or pad are carried out.

SUMMARY OF THE INVENTION

Clearly, all these movements could be carried out by means of a suitably shaped single cam gear. However, in order to provide an additional three revolutions of the turntable such a cam gear would need to be made about twice the size of conventional ones for comparable life and performance and in order to avoid too rapid movements of the parts. The invention therefore includes a novel arrangement of two cam gears which is capable of effecting the necessary movements. This arrangement comprises first and second cam gears each having a suitably shaped cam profile for effecting actuation of the cleaning brush or pad, each of the cam gears being provided with a gap in the teeth thereof, so that the pinion means, preferably constituted by the turntable pinion, may rotate freely during the time a record is being played, the teeth of said first cam gear being arranged to engage the teeth of the pinion means at the beginning of a record changing cycle whilst the gap in the teeth of the second cam gear coincides with the teeth of the pinion means, said engagement between the first cam gear and the pinion means being effective for raising the cleaning brush or pad, moving it to a position where it extends radially across a record on the turntable, and lowering the brush or pad so that it makes cleaning engagement with the record, a further gap being provided in the first cam gear with interengaging abutments provided on said first and second cam gears respectively which engage before said further gap is reached so as to set the second cam gear in mesh with the pinion means, rotation of the second cam gear being effective for moving the cleaning brush or pad out of engagement with the record surface, with further interengaging abutments provided on said cam gears which engage before the gap in the second cam gear is reached so as to set the first cam gear in mesh with the pinion means to complete the record changing cycle.

In a preferred arrangement according to the invention the cleaning brush or pad extends generally horizontally and is mounted in a sliding, vertical pivot so that the brush or pad, in response to rotation of the first cam gear, is movable between a position where it extends radially across the record surface and a position where it is vertically clear of the record surface, and is movable vertically to effect cleaning engagement with the record surface. The cleaning brush or pad may also be horizontally pivoted and rotatable from its normal cleaning attitude to an angular position where the cleaning brush or pad is clear of the record surface.

Although the invention can be applied to conventional record changers of the pivoted pickup kind it is especially suited to a record changer of novel design employing parallel tracking and described in our British copending application No. 58387/67 and an example of the invention will now be described in connection with such a record changer.

BRIEF DESCRIPTION OF THE DRAWINGS

So that the invention may be clearly understood an example of one form of it will now be described in connection with the accompanying somewhat diagrammatic drawings in which.

DESCRIPTION OF THE PREFERRED EMBODIMENTS

Figure 1:
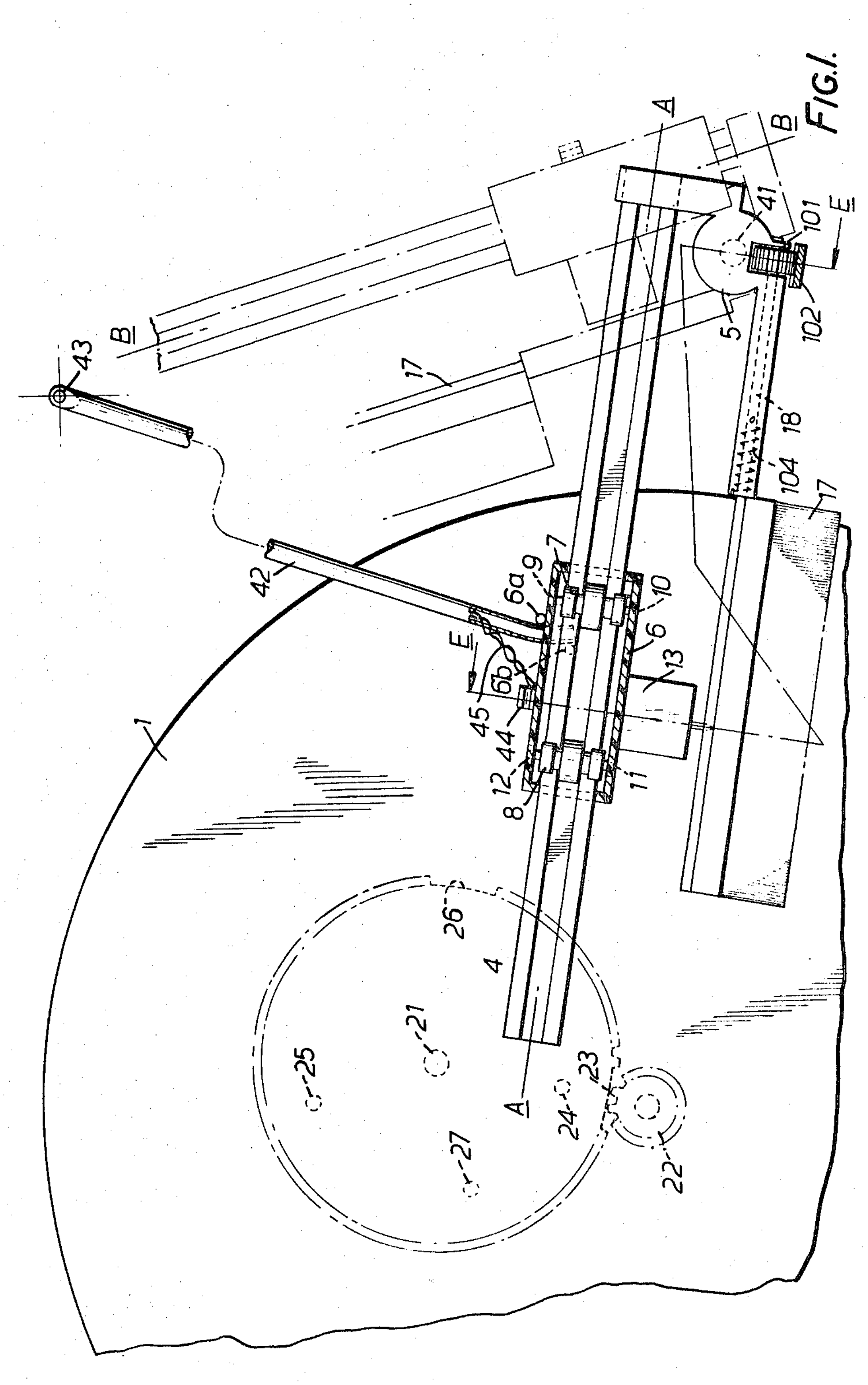
FIG. 1 is a plan view showing part of a turntable carrying a 12-inch record, and a parallel tracking pickup arm and its associated components.

The turntable 1 is shown mounted on a supporting plate 2 by means of main bearings 3 carried by supporting brackets 3*a*. A track arm 4 is mounted on a vertically pivoted post 5 so as to be able to swing between a position on the line A–A where it is shown in full in FIG. 1 and a position on the line B–B where it is shown in broken outline. The post 5 is also capable of vertical movement. A carriage 6 is arranged to move freely along the track arm 4 on rollers 7 and 8, and a transducer 13, mounted on mounting bracket 14 is pivoted on the carriage 6 by means of transverse pivots 15 and 16.

An auxiliary swinging tubular arm 42 (FIG. 1) is provided and this is pivoted on the plate 2 at pivot 43. The arm 42 leads the conductors 45 for the transducer 13 to the carriage 6 and also imparts movement to and senses the position of the carriage 6 by means of two pins 6*a* and 6*b*. The arm 42 is designed to have low mass and minimum pivot friction, and the resistance to motion of the carriage 6 is kept low by employing jewel pivots 9, 10, 11 and 12 for the rollers 7 and 8. These pivots are carried in two light alloy bearing housings which fit into suitable recesses in the body of the carriage 6, which may itself be of lightweight plastic material such as polyphenylene oxide. The pivots 15 and 16 carrying the transducer 13 are also arranged to be jewelled pivots.

The vertical post 5 in addition to carrying the tracking arm 4 is also arranged to carry a horizontally extending record-cleaning brush 17 which may be rotated from the position shown in FIG. 1 to a position with its bristles vertical for cleaning the record. The record-cleaning brush 17 is carried on a bored extension 18 so that it can pivot between the position shown in FIG. 1 and a position in which the bristles are normal to the record surface.

Before describing in detail the mechanism for operating the record changer it is believed that an understanding of the invention would be facilitated by a statement of the sequence of operations which occur in use.

The sequence starts with the record changer at rest, with the parallel tracking arm 4 swung outwardly towards the edge of the record changer cabinet. A stack of records is placed on a shouldered record spindle, the stack being controlled horizontally by an overarm or an edge platform. Upon switching the record player control to automatic, the tracking arm 4 with the cleaning brush 17 pointing downwards, will lift vertically sufficient to clear a stack of records which may be on the turntable 1. The arm 4 will then swing in so that the parallel track arm 4 is correctly related to the true line of the turntable.

The arm 4 is then lowered until the brush 17 contacts the surface of the record, so sensing the height of the record and causing the arm 4 to be held in that position. The main cam is stopped and the turntable is caused to rotate three or four revolutions in order for the record to be cleaned free of dust particles. Just before the end of the cleaning operation the arm 4 is raised horizontally and the brush 17 when clear of the record, moves to its horizontal position. The main cam is then restarted to continue the cycle as follows: the auxiliary swinging tubular member 42 moves inwardly, pushing the carriage 6 along the track 4 until it arrives at a predetermined selected position, according to the size of the record. This preselected size can be obtained automatically or under manual control. It is important to note that the arrangement for the lifting of the carriage 6 and arm 4 also incorporates means to apply light friction to the carriage 6 when lifted clear of the record. This prevents the carriage 6 from sliding too freely during the time when the carriage 6 is being moved to the selected position. The transducer 13 carried by the carriage 6 is then lowered an amount sufficient to bring its stylus in contact with the record and to maintain the correct height of the transducer pivots above the record. The friction on the carriage 6 is removed when the arm 4 lowers to the playing position.

As the stylus follows the record groove the carriage 6 moves inwardly taking with it the tubular auxiliary arm 42 carrying the transducer leads 45. This arm 42 swings about its pivot 43 and will engage an automatic trip mechanism towards the end of the record and operates the trip mechanism when the fast runout groove is reached, causing the main cam to once again rotate. At this point the tracking arm 4 will lift to its maximum height and will swing outwardly to its rest position, and then another record will drop from the stack. During the outward swing of the arm 4, the brush 17 pivots to point downwards ready for the next operation. The cycle will then be repeated until the last record is cleaned and played when the movement of the arm 4 to its rest position will cause the unit to switch off.

The movement of the tracking arm 4, of the arm 42, of the brush 17 and of the record stacking and dropping mechanism, (which, being conventional, is not shown) are all derived from the motor-driven turntable 1 through a pinion 22 at its centre Since it is desirable for several revolutions of the turntable to take place for cleaning purposes and since this is best carried out before play, a special arrangement of two cam gears driven by the pinion 22 is employed in place of the usual single cam gear.

Two gears 19 and 20 mounted on a common shaft 21 are engaged by a common pinion 22 mounted on the turntable spindle. Both gears have a gap in their teeth at point 23, permitting the turntable 1 to revolve freely without movement of the gears when the two gaps coincide with the teeth of the pinion 22.

At the commencement or end of a cycle, the upper gear 19 is engaged with the pinion 22 by known means, and this gear 19 revolves anticlockwise until pin 24, fixed on the underside of gear 19 contacts pin 25 fixed on the upper side of gear 20. Gear 20 is then driven by gear 19 and will revolve with it until a second gap 26 in the gear teeth of gear 19 causes gear 19 to stop when gap 26 lines up with pinion 22. At this point the teeth on gear 20 will still be engaged with pinion 22. The gear 20 will thus continue to rotate whilst gear 19 is stationary until a second pin 27 mounted on the upper side of gear 20 contacts pin 24. Gear 19 is then driven by gear 20 and will revolve with it until the gap 23 on gear 20 is in line with the pinion 22. Gear 20 will then stop, but gear 19 will carry on rotating until the gap 23 on gear 19 lines up with pinion 22. Both gears are then at rest. It will be seen that the length of time that gear 19 is stopped is controlled by the angular position of the second pin 27.

On the upper side of gear 19 is fixed a cam 28 having a number of cam profiles (not shown) which effect the lift and lowering mechanism of the tracking arm 4 via link 29 and bellcrank lever 30 pivoted at 31. The inward and outward swing of the tracking arm 4 is obtained via a lever 32 which is pivoted at 33 and rotates lever 34 through pin 35. Pin 36 fixed to lever 34 locates in a slot extending from a bracket 37 fixedly secured to the tone arm 4 and thus a lobe on cam 28 causes bracket 37 to move angularly to control the angular movement of the tracking arm 4.

A cam 46 fixed to the lower side of gear 20 is provided with a cam profile (not shown) which controls the height adjustment of the transducer 6 relative to the record surface and also causes the record cleaning brush 17 to be rotated from the vertical to horizontal position.

Control of the height of the tracking arm 4 and hence the carriage 6 and transducer 13 is obtained by means of a spindle 41 attached to the tracking arm 4, the spindle 41 being provided along its length with a number of circular, buttress-type grooves. A ratchet pawl 40 mounted on a pivoted bellcrank lever 39 is arranged to engage the grooves of the spindle 41, and movement of the pawl 40 is obtained via the bellcrank lever 39 and a mechanical link 38 which contacts the cam profile of the cam 46 fixed to gear 20.

Figure 2:
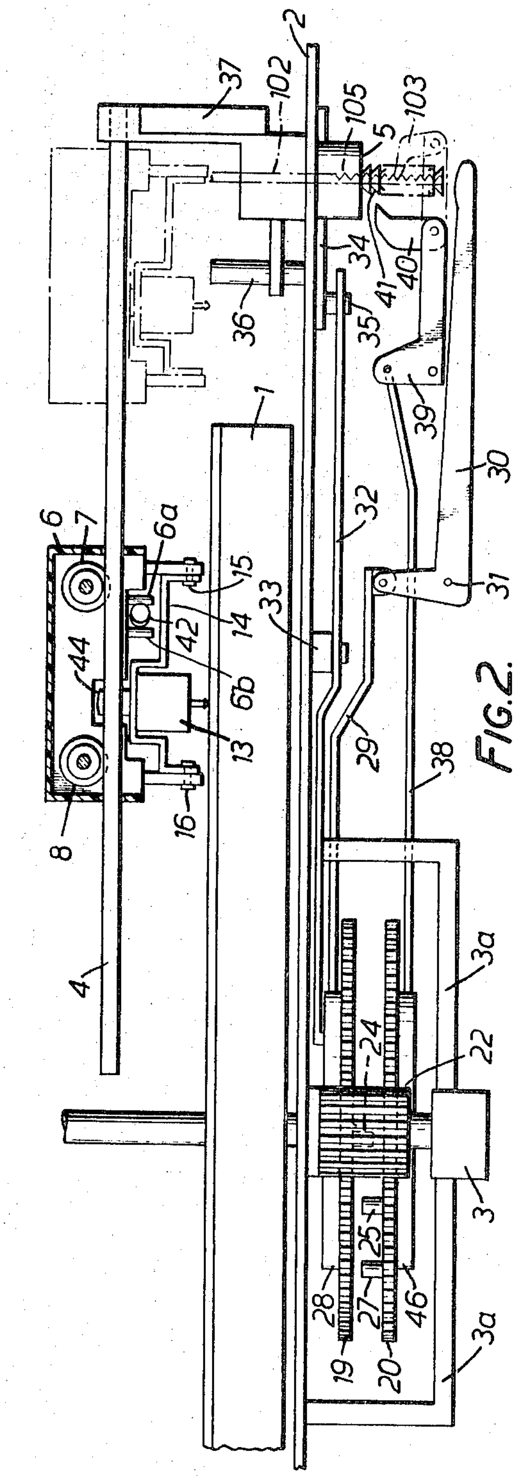
FIG. 2 is a front elevation of the view shown in FIG. 1.
Figure 3:
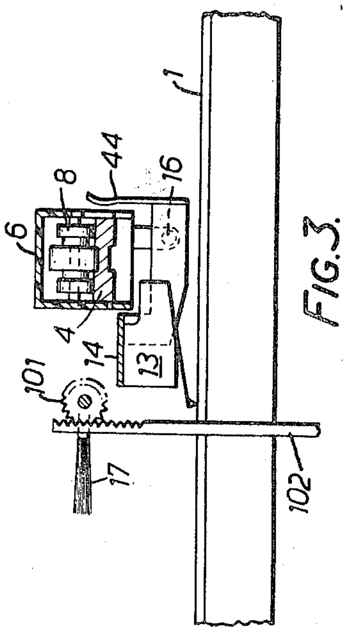
FIG. 3 is a section on the line E–E of FIG. 1.

Rotation of the brush 17 within the bored extension 18 is obtained via a rack and pinion action, a pinion 101 being attached to the shank of the brush 17 and a rack 102, which engages with the pinion 101 at one end, arranged parallel with the spindle 41, the rack 102 being operated by means of a further pawl 103 (shown in dotted outline in FIG. 2) which is mounted on an extension of the bellcrank lever 39 (the extension also being shown in dotted outline in FIG. 2) the pawl 103 engaging with teeth 105 on the lower end of the rack 102.

Thus, when the bellcrank lever 39 is operated by means of the cam profile on cam 20, the spindle 41 is raised by means of the pawl 40 and also the rack 102 is raised by means of the pawl 103 so that the pinion 101 is rotated, thereby rotating the brush 17 from the vertical to the horizontal position.

The complete record cleaning and playing cycle is therefore as follows:

Assume the tracking arm 4 to be in its outward rest position with the carriage 6 at its outermost position on the arm 4 and with the brush 17 in the vertical position. The gear 19 is caused to be rotated by means of the pinion 22, and the arm 4 is raised by means of the lever 30, link 29 and the cam profile on cam 28 attached to gear 19. The arm 4 is then caused to be swung inwards over a record positioned on the record changer turntable 1, by means of lever 34, lever 32, and the cam profile on cam 28, and is then lowered so that the cleaning brush 17 contacts the record.

At this point the gear 19 stops and the gear 20 begins to rotate, and the turntable is rotated two or three times in order to clean the record.

Towards the end of the cleaning cycle, the lever 39 is moved by the link 38 and the cam profile on cam 46, so that the pawl 40 engages with one of grooves in spindle 41, and the lever 39 is actuated such that the spindle 41 and the rack 102 (via pawl 103) are raised, so that the brush 17 is lifted clear of the record. The action of raising the rack 102 has the effect of rotating the brush 17 from the vertical to the horizontal position. The auxiliary arm 42 is now caused to be operated by means of the cam 46 and links (not shown) to move the carriage 6 from its outermost position towards the center of the record to a position at which the stylus of the transducer 13 coincides with the outermost groove of the record. The lever 39 is then actuated slightly to allow the transducer stylus to be lowered onto the record but not enough for the brush 17 to be appreciably rotated from the horizontal position. Shortly before this operation gear 19 is rotated once more and gear 20 is caused to be stopped. Gear 19 will continue to rotate until the gap 23 in its teeth coincides with the pinion 22 at which time it will also stop.

During this time, the turntable is continually driven so that the record on the turntable is played and at the end of the record, the auxiliary arm 42 is arranged to operate a trip mechanism (not shown) of known form which causes the gear 19 to once again engage with the pinion 22.

The cam profiles on cam 28 then cause the tracking arm 4 to be raised, and the carriage 6 returned to its outermost position. The arm 4 is then swung out and lowered to its rest position. The action of the arm 4 being swung outwards, causes the pawl 103 to be disengaged from the teeth 105 of rack 102, and the brush 17 is then rotated back to the vertical position by means of a spring 104 contained within the bored extension 18. If there are no more records to be played, the outward movement of the arm 4 is arranged to switch off the record player. If there are more records to be played the cycle is repeated.

In the event that the brush 17 is too soft to act as a temporary support for the pickup arm 4, its function in determining the height of the arm above the playing surface of the record may be performed by a feeler or roller which acts in the same way to engage the record surface.

This measurement of record height and vertical positioning of the tone arm is most important since in normal-swinging tone-arm pickup arrangements the length of the arm is relied upon to prevent "warp wow," that is the cyclic change in frequency due to excursion of the stylus in the direction of the length of the record groove as the angle of the arm changes when the stylus rides over a bump in the record. The longer the arm the less pronounced is this effect. However, by positioning the pivot very close to the level of the record surface and by maintaining the distance fixed, the effect of "warp wow" can be reduced to negligible proportions.

As has been stated earlier when the carriage 6 is being moved by the arm 42 along the tracking arm 4 it is desirable to apply light friction so that when control is taken off the arm 42 the transducer 13 will stay in position until it engages the required groove. This is achieved by an arm 44 extending upwards from the pivoted mounting 14 of the transducer 13. When the stylus of the transducer 13 is lifted clear of the record the weight of the transducer 13 causes the end of the arm 44 to bear against the side of the track. Thus the requisite friction is applied but is always removed immediately the stylus engages the groove.

The track arm 4, in a preferred form, is of channel section and the rollers 7 and 8 have an increased diameter at the centre to form guiding means along the track.

Preferably the construction is such that when the turntable 1 is level the track 4 slopes downwards slightly towards the centre. Thus during play inaccuracies in level of the apparatus as a whole may result in an increased bias towards the centre tending to overcome the friction of the carriage 6 on the track 4 but are unlikely to result in any bias in the opposite direction.

I claim:

1. In an automatic record-changing disc record player comprising a supporting plate, a rotatable turntable pivoted on said plate and adapted to have records positioned thereon, pickup means selectively displaceable into and out of operative engagement with a record on said turntable, a cleaning brush or pad horizontally movable between a first position in which the brush or pad extends substantially radially along the entire grooved portion of a record positioned on the turntable and a second position where it is vertically clear of the record, means for causing the record cleaning brush or pad to be moved between said two positions, and means operable when the cleaning brush or pad is in the first position and said pickup means is out of said operative engagement with a record for vertically moving the record cleaning brush or pad into and out of cleaning engagement with a record positioned on said turntable.

2. In a record player according to claim 1, in which the means for horizontally and vertically moving the cleaning brush or pad includes first and second cam gears each having a suitably shaped cam profile, and a mechanical linkage associated with each of the cam profiles for effecting movement of the cleaning brush or pad.

3. In a record player according to claim 1, including a pinion gear attached to the turntable, the pinion gear and each of the first and second cam gears being arranged to intermesh, each of the cam gears being provided with a gap in the teeth thereof whereby when the gaps in the cam gears coincide with the teeth of the pinion gear the pinion gear is allowed to rotate freely.

4. In a record player according to claim 3, including first and second interengaging abutments affixed to the first and second cam gears and a further gap provided in the teeth of the first cam gear, said gears being disposed so that the teeth of the first cam gear and the gap of the second cam gear coincide with the teeth of the pinion gear at the beginning of a record changing cycle, rotation of the first cam gear due to the pinion gear being effective for operating a mechanical linkage associated therewith for vertically raising the cleaning brush or pad, moving it to a position where it extends substantially radially across the record on the turntable and lowering the cleaning brush or pad so that it makes cleaning engagement with the record, the first interengaging abutments on the cam gears being arranged to engage before the further gap in the first cam gear coincides with the teeth of the pinion gear, engagement of the first interengaging abutments being effective for causing the second cam gear due to mesh with the pinion gear, rotation of the second cam gear due to the pinion gear being effective for causing a mechanical linkage associated therewith to be operated to move the cleaning brush or pad out of cleaning engagement with the record, the second interengaging abutments on the cam gears being caused to engage before the gap in the second cam gear coincides with the teeth of the pinion gear so as to set the first cam gear in mesh with the pinion gear to complete the record changing cycle.

5. In a record player according to claim 1, including a tracking arm arranged substantially parallel to the cleaning brush or pad and affixed thereto, a transducer element arranged for movement along the tracking arm, and an auxiliary arm pivotally mounted on the supporting plate for causing the transducer element to be moved along the arm.

6. In a record player according to claim 5, including a cam gear having a suitable cam profile, a mechanical linkage associated with said cam profile for effecting vertical movement of said brush or pad, a rack and pinion gear associated with the mechanical linkage of the cam gear and the cleaning brush or pad respectively, movement of the mechanical linkage associated with the second cam gear due to the movement thereof being effective for vertically raising the cleaning brush or pad and the tracking arm, for causing the rack and pinion gear to be operated to cause the cleaning brush or pad to be vertically rotated, and for causing the cleaning brush or pad and tracking arm to be lowered so that the transducer element makes contact with a record on the turntable.